United States Patent
Brooks et al.

(10) Patent No.: US 10,565,603 B2
(45) Date of Patent: Feb. 18, 2020

(54) SEGMENTS OF CONTACTS

(71) Applicant: Open Text Corporation, Waterloo (CA)

(72) Inventors: Roger Khemraj Brooks, Palo Alto, CA (US); Choudur Lakshminarayan, Austin, TX (US); Erin M. Burgoon, Austin, TX (US)

(73) Assignee: Open Text Corporation, Waterloo (CA)

( * ) Notice: Subject to any disclaimer, the term of this patent is extended or adjusted under 35 U.S.C. 154(b) by 355 days.

(21) Appl. No.: 15/111,324

(22) PCT Filed: Jan. 31, 2014

(86) PCT No.: PCT/US2014/014075
§ 371 (c)(1),
(2) Date: Jul. 13, 2016

(87) PCT Pub. No.: WO2015/116150
PCT Pub. Date: Aug. 6, 2015

(65) Prior Publication Data
US 2016/0350774 A1    Dec. 1, 2016

(51) Int. Cl.
*G06Q 30/02*         (2012.01)
*G06Q 10/06*         (2012.01)

(52) U.S. Cl.
CPC ... *G06Q 30/0204* (2013.01); *G06Q 10/06393* (2013.01)

(58) Field of Classification Search
None
See application file for complete search history.

(56) References Cited

U.S. PATENT DOCUMENTS

| | | | |
|---|---|---|---|
| 6,049,797 A * | 4/2000 | Guha | G06F 17/30598 |
| 7,917,383 B2 | 3/2011 | Maga et al. | |
| 8,306,845 B2 | 11/2012 | D'Imporzano et al. | |
| 9,258,264 B1 * | 2/2016 | Shoham | H04L 51/32 |
| 2003/0212520 A1 * | 11/2003 | Campos | G06F 17/30601 |
| | | | 702/101 |

(Continued)

FOREIGN PATENT DOCUMENTS

EP    2110780    10/2009

OTHER PUBLICATIONS

International Search Report issued for PCT Application No. PCT/US2014/014075, dated Oct. 27, 2014, 7 pages.

(Continued)

*Primary Examiner* — Stephanie Z Delich
(74) *Attorney, Agent, or Firm* — Sprinkle IP Law Group

(57) ABSTRACT

A method is provided in accordance with an aspect of the present disclosure. The method includes processing data related to a group of contacts, where the data includes at least one attribute related to each of the contacts. The method also includes defining the at least one attribute based on a probability distribution of a context in relation to attribute values of the at least one attribute for all contacts. The method further includes determining clusters of contacts based on the probability distribution of the context in relation to the attribute values of the at least one attribute for all contacts, and constructing a plurality of segments of similar contacts by using the clusters.

18 Claims, 7 Drawing Sheets

(56) References Cited

U.S. PATENT DOCUMENTS

| | | | |
|---|---|---|---|
| 2004/0103051 A1 | 5/2004 | Reed et al. | |
| 2004/0181408 A1* | 9/2004 | Acero | G10L 15/144 704/255 |
| 2007/0143179 A1* | 6/2007 | Eyal | G06Q 30/00 705/14.41 |
| 2008/0065476 A1 | 3/2008 | Klein et al. | |
| 2009/0307054 A1* | 12/2009 | D'Imporzano | G06Q 10/06393 705/7.29 |
| 2012/0030061 A1 | 2/2012 | Lu et al. | |
| 2012/0265614 A1* | 10/2012 | Douglas | G06Q 30/02 705/14.54 |
| 2016/0350774 A1 | 12/2016 | Brooks et al. | |

OTHER PUBLICATIONS

International Preliminary Report on Patentability issued for PCT Application No. PCT/US2014/014075, dated Aug. 11, 2016, 6 pages.

Extended European Search Report issued for European Patent Application No. 14880414.9, dated Sep. 4, 2017, 9 pages.

Business Intelligence for Marketing—KPI for Marketing, (Web Page), Retrieved Jan. 17, 2014, 2 Pages.

Kaushik, A, Occam's Razor, (Research Paper), Dec. 6, 2013, 12 Pages, http://www.kaushik.net/avinash/best-web-metrics-kpis-small-medium-large-business/.

Tealeaf cxView, (Web Page), Retrieved Dec. 9, 2013, 3 Pages, http://www-03.ibm.com/software/products/et/cx-view.

\* cited by examiner

SEGMENTS OF CONTACTS

CROSS-REFERENCE TO RELATED APPLICATION

This application is a U.S. National Stage Application of and claims priority to International Patent Application No. PCT/US2014/014075, filed on Jan. 31, 2014, and entitled "SEGMENTS OF CONTACTS," which is hereby incorporated by reference in its entirety.

BACKGROUND

Marketing of new and existing products or services is an important tool for many organizations and business. Marketing helps these organizations and business to communicate the value of their products or services to potential consumers (also called contacts) for the purpose of influencing buyer behavior. In many situations, the pool of potential consumers to which these businesses or organizations may offer their products or services is extremely large.

DETAILED DESCRIPTION

Figure 1:
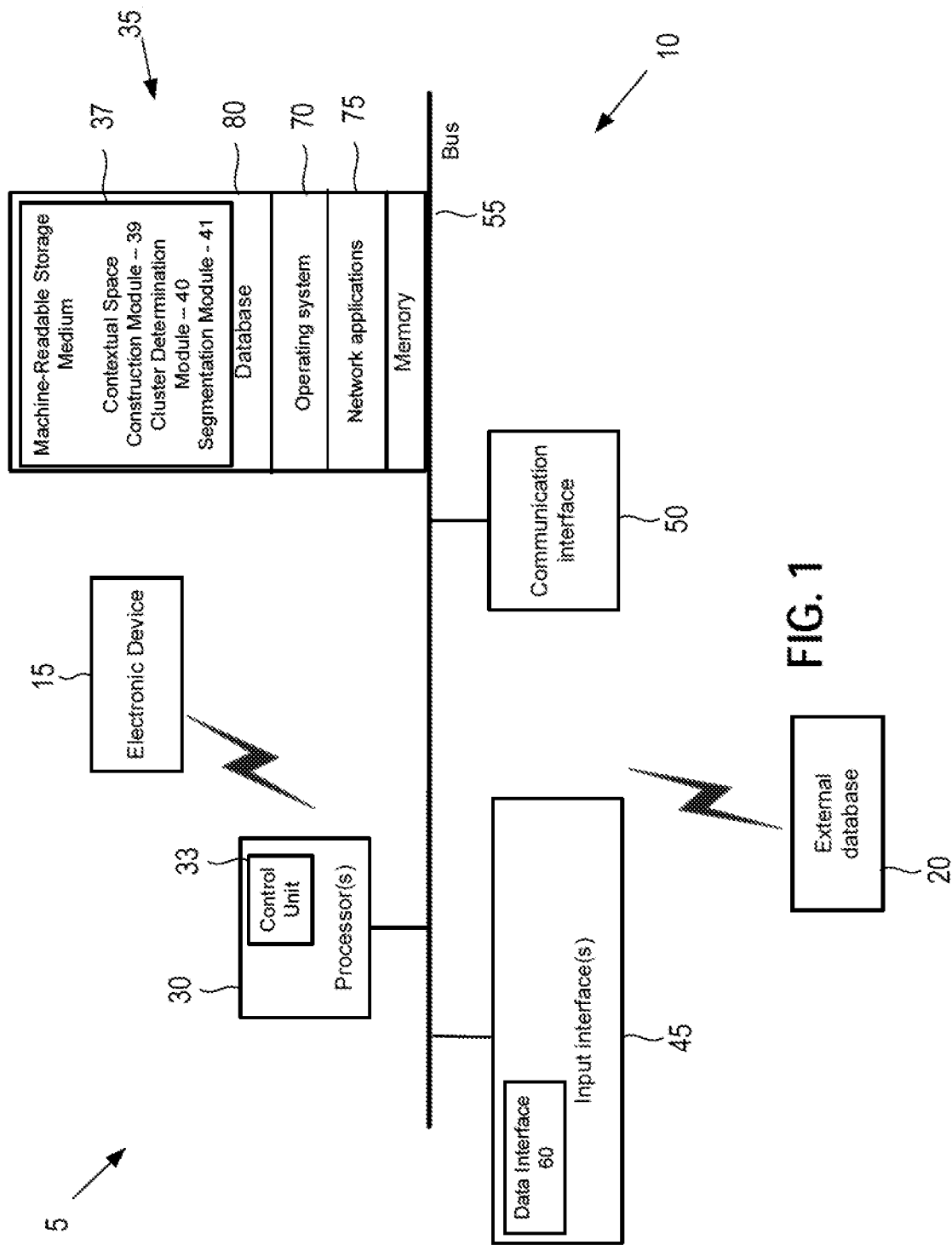
FIG. 1 is a schematic illustration of an example of a system for constructing market segments of consumers in accordance with an implementation of the present disclosure.

As mentioned above, organizations and businesses often rely on various marketing tools to communicate the value of their products or services to potential consumers (also referred to as contacts). In many situations, the pool of potential consumers is so large that a decision maker (e.g., a marketer) may have difficulty selecting what are the best groups or segments of potential consumers to which to market the products or services. In addition, marketers or decision makers often have a limited marketing budget, so identifying the best possible segments of potential consumers is very important. Therefore, marketers or decision makers are always looking for tools to help them to determine specific segments of potential consumers that are related to their goal in order to have a greater success selling their products or services.

Many times, manual comparison between all consumers or groups of potential consumers that are available to a decision maker is unfeasible and very time consuming. The difficulty in selecting the best possible groups of potential consumers is due to the large number of possible consumers, the specific characteristics defining the consumers, internal rules and procedures the decision maker must follow, and his and her subjective preferences. In such complex situations, computer implemented tools may assist decision makers with refining their preferences and selecting the best possible group of potential consumers that may be interested in the offered products or services. That way, the decision makers may concentrate their marketing efforts and funds to the selected segments of potential consumers and may have a greater marketing success.

With the continued developments in technology, the interaction between vendors (e.g., suppliers of products or services), marketers, and consumers has been replaced by a digital relationship. That trend transitioned traditional marketing to digital marketing, which uses various electronic devices (e.g., personal computers, smartphones, tablets, etc.) and electronic platforms or methods of communication (e.g., websites, e-mail, mobile applications, etc.) to engage with potential consumers. Many organizations combine their marketing efforts in both traditional and digital marketing channels.

Digital marketing allows marketers to have a direct one-on-one interaction with potential consumers (e.g., when consumers visit the vendors website, receive an email from the vendor, etc.). Therefore, it is very important for marketers to successfully market their products or services to the potential consumers during that direct interaction. This may be achieved by personalizing the marketing tools according to the needs of specific consumers and selecting the correct segment of consumers to which the products or services are offered via the digital channels.

One way of identifying segments of similar consumers is to analyze the behavior of these consumers and to group them according to their similar behavioral characteristics. Dividing a large group of consumers to segments of consumers that have idiosyncratic characteristics or behavior helps the marketers to present a unique marketing experience to each segment in order to influence the consumers to purchase their products or services. However, segmentation of potential consumers can be difficult and a time consuming process that not always leads to a set of consumer segments that are actionable from a marketing perspective. Thus, marketers may be directing their efforts and funds to consumers that may not be interested in the marketed products or services.

In order to track the results or the success of their marketing campaign, decision makers or marketers may use a Key Performance Indicator ("KPI"). The KPI may differ widely depending on the marketer's budget, goals, and objectives. Therefore, the ultimate goal of marketers or decision makers is to identify segments of consumers that are aligned with the chosen KPI and are "actionable." Actionable segments exist when explicit characteristics for the selected segments of consumers can be used to directly interact with consumers to take some action measured by the KPI.

The present description is directed to systems, methods, and computer readable media for constructing market segments of consumers. Specifically, the present description proposes and approach for identifying segments of similar consumers by analyzing the consumers in the context of the marketer's KPI.

In particular, the disclosed systems, methods, and computer readable media propose evaluating the behavior of proposed consumers by assessing their responses to digital stimulus (e.g., promotion by email, on a website, social media, etc.) during an event (i.e., a contact of the consumer with the marketer by visiting a website, opening an email, etc.) in the digital channel. The proposed systems, methods, and computer readable media characterize each of the consumers and the event in the digital channel by a set of attributes. These attributes can be used by marketers to optimize the identified KPI. Each of the attributes for each potential consumer is associated with a specific attribute value for every consumer.

The proposed solution defines the attributes related to the consumer based on a probability distribution of a context (e.g., a quantifier such as marketer's KPI) in relation to attribute values of each of the attributes for all consumers to construct a "contextual space" for each attribute. The contextual space is a non-Euclidean topological space over the values of the attribute(s) with a metric derived from the probability distribution of the context given each attribute's values for each consumer. Using the metric, the solution determines clusters of consumers based on the probability distribution of the context in relation to the attribute values of the attribute for all consumers. Segments of similar consumers are identified based on the clusters. Each of the identified segments includes potential consumers that have similar attribute values in relation to the KPI and, therefore, these consumers may have similar characteristics. The quality of the identified segments is based on their alignment with the marketer's KPI. The marketer's KPI is optimized by measuring the similarity of the values of the selected attributes to those of consumers who have behaved the way the marketer desires (e.g., in a response of a promotion the consumer purchased the product).

Thus, the proposed solution identifies segments that are valuable to the marketer because they include potential consumers that may be in alignment with the marketer's KPI and, therefore, may respond to marketing efforts related to the KPI. Segments or potential consumers that are not in alignment with the marketer's KPI are easily identified and eliminated. As described in additional details below, the proposed solution also offers unique processes for identifying an optimal number of clusters, upon which the segments are based, and for constructing the plurality of segments based on the attribute values of the attributes in relation to the context (i.e., the KPI).

The disclosed systems, methods, and computer readable media analyze consumer behavior over digital channels and identify the KPI similarity between the consumers based on the attributes for these consumers. The solution automatically discovers the idiosyncratic, targetable characteristics of the members of identified segments based on their relationship with a context (e.g., the KPI). The solution lifts the marketer's KPI when resources from the available marketing funds are diverted from the general population of potential consumers to subsets of consumers in the identified segments. The segments identified with the proposed solution are "actionable," such as the marketer may use explicit characteristics of the identified segments of consumers to promote to these consumers that are aligned with the marketer's KPI via the marketer's digital channels.

As used herein, the terms "marketer," "decision maker", and "vendor" may be used interchangeably and refer to any of the parties that may be responsible for promoting or marketing products or services to potential consumers and for distributing a budged related to that. It is to be understood that the vendor (i.e., the supplier of products and services) and the marketer (i.e., the promoter of products and services) may or may not be the same party.

As used herein, the term "segment" refers to a group of potential consumers that is selected from a larger pool or set of potential consumers. The segment of consumers is identified based on their attributes in relation to the marketer's KPI such as a marketer may directly exploit these characteristics to identify and target consumers who are best aligned with the KPI and may have a greater success in marketing their products or services.

As used herein, the term "KPI" refers to a tool or an indicator used by marketers to track the results of their marketing efforts and campaigns. The types of KPI can differ between different marketers based on the marketers' budget, goals, and objectives. For example a common KPI used by many marketers is the number of items sold in a result of the marketing campaign.

As used herein, the term "attribute" refers to a characteristic or a property of a participant in a collection of data (e.g., a consumer), which can be either directly measured or inferred. An attribute may be related to a KPI, such as to characterize a consumer in a manner relevant to the KPI. An attribute may also be related to various consumer data: demographic data (e.g., marital status, gender, age, race, etc.); geographic data (e.g., home country, home city, zip code, etc.); psychographic data (e.g., personality: outgoing, ambitious, introverted, etc.; lifestyle: suburban, urban, settled, blue-collar, mid-life success, student, etc.); affinity/product/brand data (e.g., product purchase history, product features desired/needed, etc.); clickstream/transactional data (e.g., page view ID; visitor ID; visitor IP address, etc.); social media data (e.g., referrals, hares, likes, follows, etc.) and any other type of data.

As used herein, the term "digital stimulus" refers to any electronic offering by the vendor or marketer to a consumer in relation to a product or a service. Such electronic offerings may include a promotion by email, an offer or a link on a website, an offering sent via text message or via social media, or any other type of electronic offering.

As used herein, the term "event in the digital channel" refers to any direct digital contact between a consumer and a vendor or a marketer. Such event may include a visit the vendor's website, opening an email from the vendor or the marketer, clicking on a link provided by the vendor or the marketer, or any other type of even in the digital channel.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

FIG. 1 is a schematic illustration of an example of a system 5 for constructing market segments of consumers.

The system 5 includes at least one computing device 10 capable of carrying out the techniques described below. The computing device 10 can be a personal computer, a laptop, a server, a mobile device, a plurality of distributed computing devices, or any other suitable computing device. In the illustrated example, the computing device 10 includes at least one processing device 30 (also called a processor), a memory resource 35, input interface(s) 45, and communication interface 50. In other examples, the computing device 10 includes additional, fewer, or different components for carrying out the functionality described herein.

As explained in additional detail below, the computing device 10 includes software, hardware, or a suitable combination thereof configured to enable functionality of the computing device 10 and to allow it to carry the techniques described below and to interact with the one or more external systems/devices. For example, the computing device 10 includes communication interfaces (e.g., a Wi-Fi® interface, a Bluetooth® interface, a 3G interface, a 4G interface, a near filed communication (NFC) interface, etc.) that are used to connect with external devices/systems and/or to a network (not shown). The network may include any suitable type or configuration of network to allow for communication between the computing device 10 and any external devices/systems.

For example, the computing device 10 can communicate with at least one electronic device 15 (e.g., a computing device, a server, a plurality of distributed computing devices, etc.) or with an external database 20 to receive input data related to a plurality of potential consumers or any other type of information. It is to be understood that the operations described as being performed by the computing device 10 that are related to this description may, in some implementations, be performed or distributed between the computing device 10 and other computing devices (not shown).

The processing device 30 of the computing device 10 (e.g., a central processing unit, a group of distributed processors, a microprocessor, a microcontroller, an application-specific integrated circuit (ASIC), a graphics processor, a multiprocessor, a virtual processor, a cloud processing system, or another suitable controller or programmable device), the memory resource 35, the input interfaces 45, and the communication interface 50 are operatively coupled to a bus 55.

The communication interface 50 allows the computing device 10 to communicate with plurality of networks, communication links, and external devices. The input interfaces 45 can receive information from any internal or external devices/systems in communication with the computing device 10. In one example, the input interfaces 45 include at least a data interface 60. In other examples, the input interfaces 45 can include additional interfaces. In one implementation, the data interface 60 receives communications from the electronic device 15 or the external database 20. The communications may include at least information related a group of potential consumers. In some example, that information may include at least one attribute related to each of the consumers (or multiple attributes related to each of the consumers), an attribute value of the at least one attribute for each consumer, and a predetermined KPI.

The processor 30 includes a controller 33 (also called a control unit) and may be implemented using any suitable type of processing system where at least one processor executes computer-readable instructions stored in the memory 35. The memory resource 35 includes any suitable type, number, and configuration of volatile or non-transitory machine-readable storage media 37 to store instructions and data. Examples of machine-readable storage media 37 in the memory 35 include read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, an SD card, and other suitable magnetic, optical, physical, or electronic memory devices. The memory resource 35 may also be used for storing temporary variables or other intermediate information during execution of instructions to by the processor 30.

The memory 35 may also store an operating system 70 and network applications 75. The operating system 70 can be multi-user, multiprocessing, multitasking, multithreading, and real-time. The operating system 70 can also perform basic tasks such as recognizing input from input devices, such as a keyboard, a keypad, a mouse; sending output to a projector and a camera; keeping track of files and directories on memory 35; controlling peripheral devices, such as printers, image capture device; and managing traffic on the bus 55. The network applications 75 include various components for establishing and maintaining network connections, such as computer-readable instructions for implementing communication protocols including TCP/IP, HTTP, Ethernet®, USB®, and FireWire®.

Software stored on the non-transitory machine-readable storage media 37 and executed by the processor 30 includes, for example, firmware, applications, program data, filters, rules, program modules, and other executable instructions. The control unit 33 retrieves from the machine-readable storage media 37 and executes, among other things, instructions related to the control processes and methods described herein. In one example, the instructions stored in the non-transitory machine-readable storage media 37 implement a contextual space construction module 39, a cluster determination module 40, and a segmentation module 41. In other examples, the instructions can implement more or fewer modules (e.g., various other modules related to the operation of the system 5). In one example, modules 39-41 may be implemented with electronic circuitry used to carry out the functionality described below. As mentioned above, in addition or as an alternative, modules 39-41 may be implemented as a series of instructions encoded on a machine-readable storage medium and executable by a processor.

As explained in additional detail below, the contextual space construction module 39 constructs a contextual space for at least one attribute related to each consumer, where the contextual space defines the at least one attribute based on a probability distribution of the KPI in relation to the attribute values of the at least one attribute for all consumers (e.g., the contextual space may define a metric for the at least one attribute). In addition, the cluster determination module 40 performs clustering in the contextual space to identify optimal number clusters of consumers. The segmentation module 41 constructs a plurality of segments of similar consumers by using the clusters.

Information and data associated with the system 5 and other systems/devices can be stored, logged, processed, and analyzed to implement the control methods and processes described herein. For example, the memory 35 may include at least one database 80. In other example implementations, the system 5 may access external database (e.g., database 20) that may be stored remotely of the computing device 10 (e.g., can be accessed via a network or a cloud). The database 80 or the external database 20 may be a customer relationship management ("CRM") databases for the vendor or the merchant.

Figure 2:
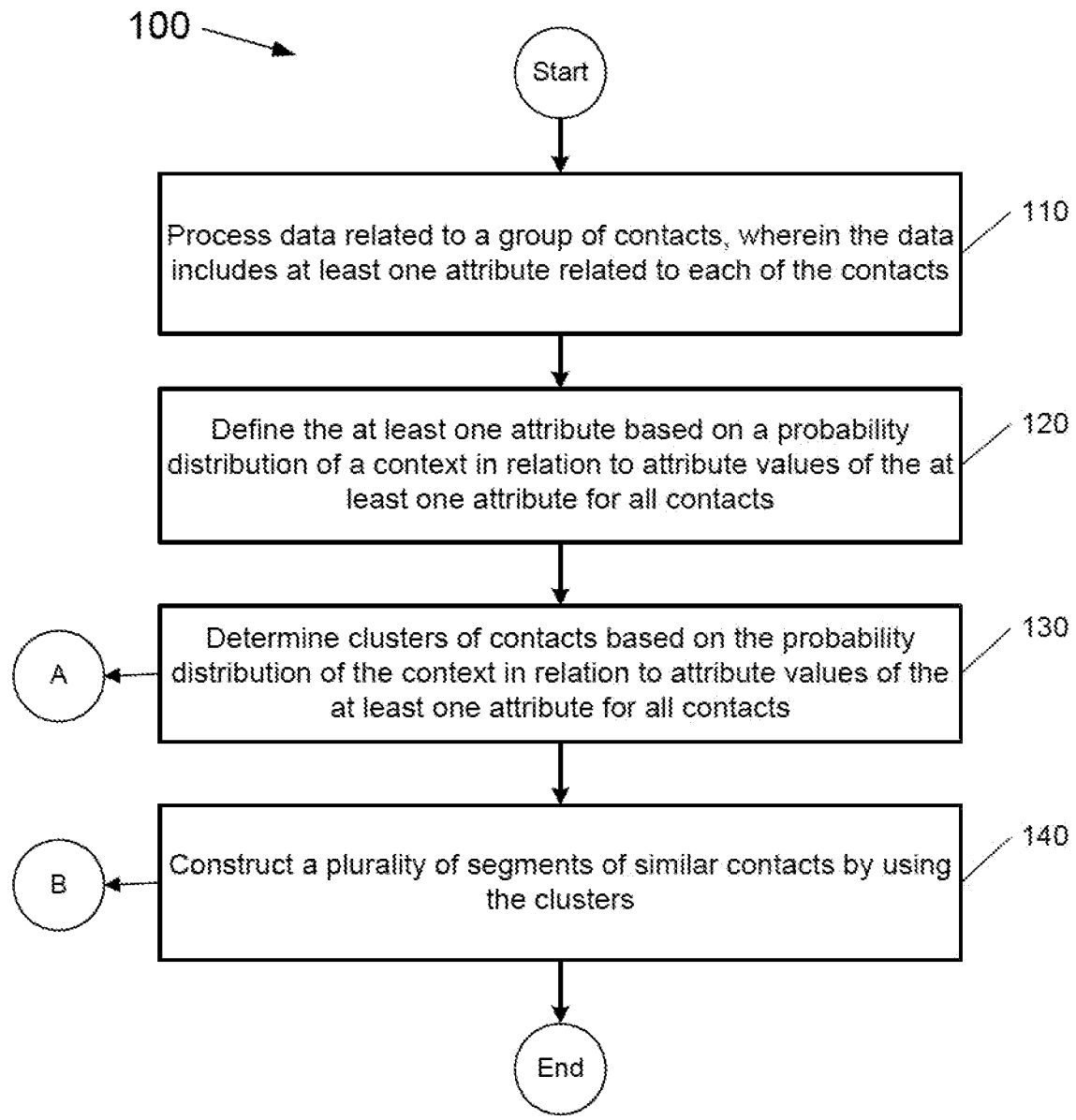
FIG. 2 illustrates a flow chart showing an example of a method for constructing market segments of consumers in accordance with an implementation of the present disclosure.

FIG. 2 illustrates a flow chart showing an example of a method 100 for constructing market segments of consumers. In one example, the method 100 can be executed by the control unit 33 of the processor 30 of the computing device 10. Various elements or blocks described herein with respect to the method 100 are capable of being executed simultaneously, in parallel, or in an order that differs from the illustrated serial manner of execution. The method 100 is also capable of being executed using additional or fewer elements than are shown in the illustrated examples.

The method 100 may be executed in the form of instructions encoded on a non-transitory machine-readable storage medium 37 executable by the processor 30 of the computing device 10. In one example, the instructions for the method 100 implement the contextual space construction module 39, the cluster determination module 40, and the segmentation module 41. In other examples, the execution of the method 100 may be distributed between the processing device 30 and other processing devices in communication with the processing device 30. In the implementation related to FIG. 2, the computing device 10 may be a device of a vendor or a marketer and may be controlled by the vendor or the marketer. Alternatively, the computing device 10 may be operated by a third party that provides services to a vendor or a marketer in order to identify a plurality of "actionable" segments of potential consumers.

The method 100 begins at block 110, where the processor 30 processes data (e.g., an input dataset) related to a group of consumers. The processed input dataset may be collected or received from any appropriate private or publically available source (e.g., the electronic device 15, the external database 80, or any other system or device) or may be stored on the database 80. In the alternative, the data may be collected by the vendor or marketer during different consumer events in the digital channels. During each event in the digital channel, various attributes related to the digital channel and the event may be retrieved. Such event attributes may include the URL or web address of the consumer, the consumer's IP address, the website the consumer came from (e.g., Google®), the full search text request from the consumer used to reach the vendor's site (i.e., all keywords typed into Google®), the type and/or the characteristics (e.g., version) of the consumer's browser, etc. For example, such event attribute data may be stored in a CRM database (e.g., databases 20, 80, etc.) of the vendor or marketer.

The processed data may include any type of information related to a group of potential consumers that is of interest to the marketer. In some examples, the processed data includes at least one attribute related to each of the consumers in the dataset (in many situations the data may include a plurality of attributes for each of the consumers), an attribute value of the at least one attribute for each consumer, and a context (e.g., a KPI) used to define the at least one attribute for each consumer. Information about the KPI may be included in the initial dataset received by the processor or may be provided by the vendor or marketer.

The control unit 33 may perform cleansing and/or enhancement on the processed data. In other words, the control unit 33 may amend or remove data that is incorrect, incomplete, improperly formatted, duplicated, etc. For example, the control unit 33 may remove unique attribute information for each consumer (e.g., the IP address of each consumer), or information that has same attribute values (e.g., the name of the website that the consumer used to reach the vendor's website). In addition, the control unit 33 may enhance or supplement the initially received data with supplementary data. In some examples, the supplementary data may include demographic, socio-economic data, or any other type of the data related to the consumers. For instance, when the dataset is collected during events in the digital channel, the vendor may collect the IP addresses of the potential consumers. The IP address of the consumer may be used to extrapolate the demographic and socio-economic attributes indexed to each consumer's geographic attributes (e.g., zip code). Such demographic and socio-economic attributes may include average income for consumers in that geographical area, average number of children, average age, etc.

Figure 3:
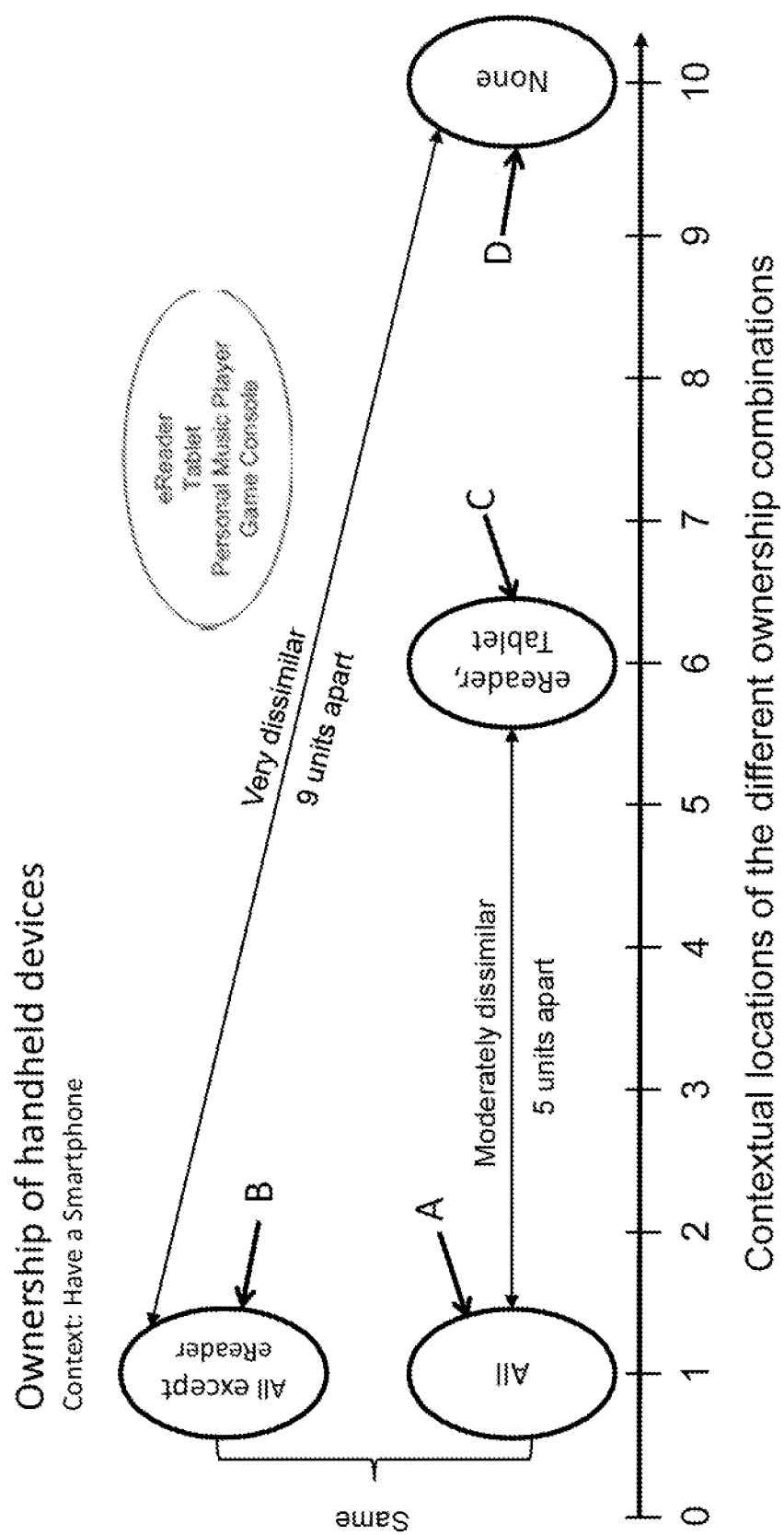
FIG. 3 illustrates an example contextual space for at least one attribute related to a plurality of consumers in accordance with an implementation of the present disclosure.

FIG. 3 illustrates an example contextual space for at least one attribute related to a plurality of consumers. The contextual space is a non-Euclidean topological space over the values of at least one attribute. As explained in additional detail below, the contextual space may define a metric derived from probability distribution of the KPI given the attribute's values for each consumer. The method 100 is described in relation to the example contextual space of potential consumers illustrated in FIG. 3. It is to be understood, that the example shown on FIG. 3 represents only one sample scenario and that the method 100 may be applied to any other analysis that involves different KPI's and/or attributes. In the example shown in FIG. 3, the context or KPI of the marketer is to identify which of the potential consumers included in the processed dataset own a smartphone. The control unit 33 processes data where potential consumers were asked to identify the specific number of electronic devices they own from a list of four possible electronic devices—an eReader, a tablet, a personal music player, and a game console. In that example, the attribute related to each of the consumers is the answer to the question—"which of the following devices do you own?" The attribute value of that attribute is the possible combination of the four devices that each of the consumers owns.

With continued reference to FIG. 2, the control unit 33 defines the at least one attribute based on a probability distribution of the context (e.g., KPI) in relation to the attribute values of the at least one attribute for all consumers (at 120). In other words, the control unit 33 constructs a contextual space for the at least one attribute (or for each of the attributes when more attributes are available) related to each consumer, where the contextual space defines the at least one attribute based on a probability distribution of the KPI in relation to all attribute values of the at least one attribute for all consumers. In the example shown in FIG. 3, the attribute (i.e., "which of the following devices do you own") for each consumer is defined by the probability distribution of the KPI (i.e., have a smartphone) in relation of the attribute values (i.e., the possible combination of devices owned by the consumers) of the attribute for all consumers.

In the example shown in FIG. 3, the desired KPI is represented by the zero value on the illustrated axis. Further, FIG. 3 illustrates four possible attribute values A, B, C, and D for the at least one attribute. Attribute value A indicates that a consumer owns all four electronic devices, B indicates that a consumer owns all devices except and eReader, C indicates that a consumer owns only an eReader and a tablet, and D indicates that a consumer owns none of the four electronic devices. As shown in FIG. 3, the attribute values (i.e., the combinations of electronic devices owned) for the at least one attribute are used to create a contextual space for the at least one attribute based on the probability distribution of the KPI in relation to these attribute values. In other words, the proposed method imposes a "context" via the conditional probability distribution of the KPI in relation to the attribute values for that attribute. The importance of the attribute values is defined based on the KPI. The method assigns a point in the contextual space for each attribute value of each attribute for each consumer. As a result, distances in the contextual space are measured relative to that context (i.e., the KPI) and are not arbitrary imposed. The similarities of the attribute values and of the consumers are determined quantitatively in the context.

As explained in additional details below, the distance between the location of each attribute value for each consumer in relation to the KPI and a centroid of a cluster of consumers is determined by using a metric calculated based on all attribute values for the at least one attribute in relation to the context. In other words, the metric for the at least one attribute may be calculated based on the probability distribution of the context given the attribute's values of that attribute over each consumer. Thus, the distances of the attribute values are computed by using a non-Euclidean metric over the values of each attribute, where that metric depends on the KPI characterizing the attribute. In other words, the proposed method does not assume a Euclidean space that is artificially imposed on the dataset of consumers, but that space is determined based on the KPI.

Therefore, the proposed method measures the similarities between consumers within a context (i.e., the KPI). Based on the given attribute values and their relation to the KPI, the control unit 33 identifies coordinates values for each attribute for each consumer. If two attribute values are close to one another, then it can be expected that the consumers associated with these values to behave similarly in respect to the KPI. In other words, consumers that have all of the four devices (e.g., consumers with attribute value A) are more similar (from KPI prospective) to consumers that have smartphones. As illustrated in FIG. 3, such consumers are positioned at value one on the axis to indicate their close relation to the KPI. On the other hand, consumers that don't own any of the four electronic devices (e.g., consumers with attribute value D) are very dissimilar to Consumers A and B and is very unlikely that they own a smartphone.

Next, at 130, the control unit 30 determines clusters of consumers based on the probability distribution of the context in relation to the attribute values of the at least one attribute for all consumers. The clusters are determined based on the analysis of the at least one attribute in the created contextual space. In one example, determining the clusters of consumers includes identifying an optimal number of clusters. This is another advantage of the proposed method, because existing clustering mechanisms produce a large amount of clusters that are difficult to manage and interpret in order to determine "actionable" segments of consumers.

Figure 4:
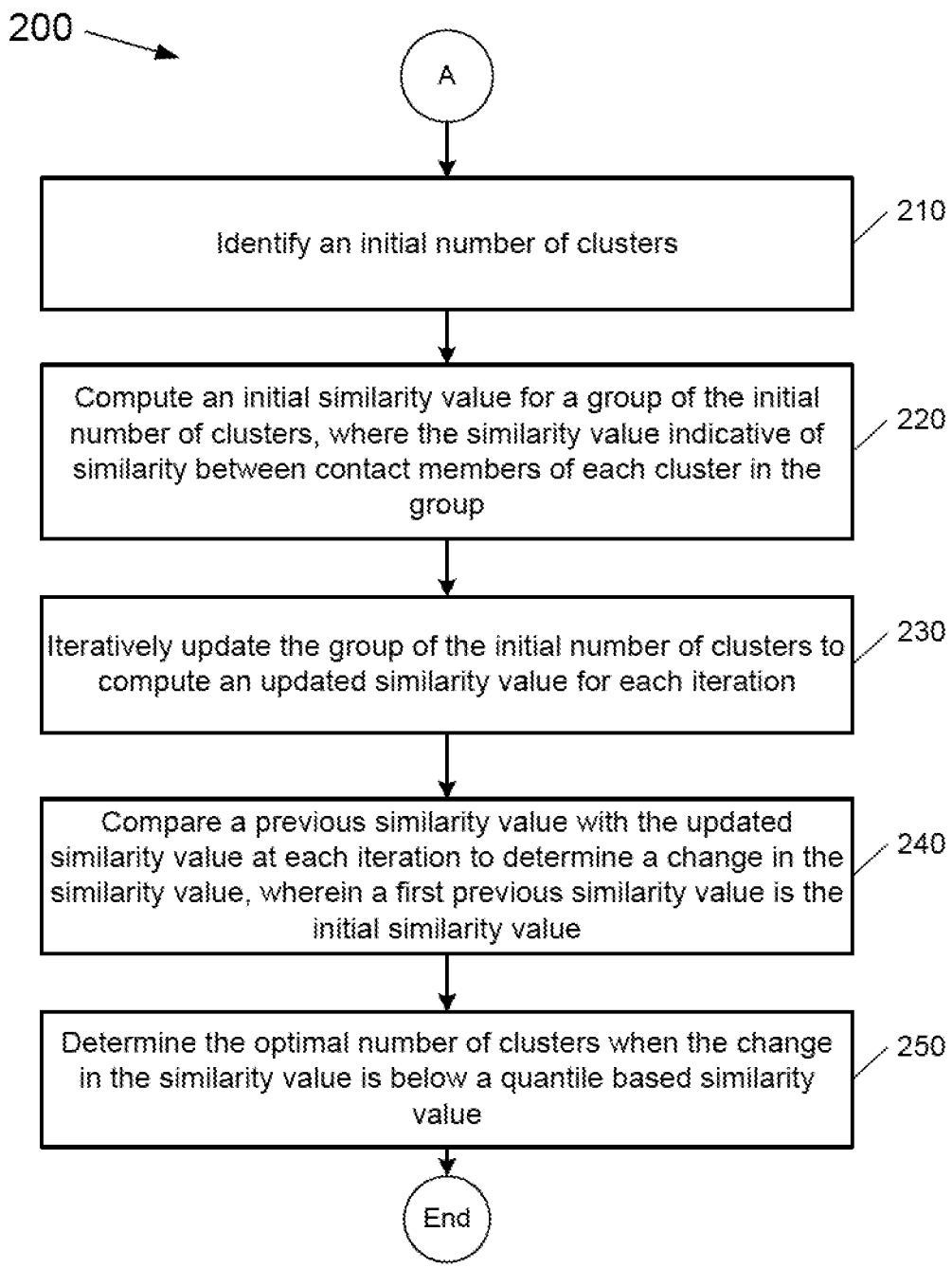
FIG. 4 illustrates a flow chart showing an example of a method for identifying an optimal number of clusters in accordance with an implementation of the present disclosure.

FIG. 4 illustrates a method 200 for identifying an optimal number of clusters. In one example, the method 200 can be executed by the control unit 33 of the processor 30. Various elements or blocks described herein with respect to the method 200 are capable of being executed simultaneously, in parallel, or in an order that differs from the illustrated serial manner of execution. The method 200 is also capable of being executed using additional or fewer elements than are shown in the illustrated examples. The method 200 may be executed in the form of instructions encoded on a non-transitory machine-readable storage medium 37 executable by the processor 30 of the computing device 10. In one example, the instructions for the method 100 implement the cluster determination module 40.

The method 200 begins at 210, where the control unit 33 identifies an initial number of clusters for the originally processed dataset of consumers. In one example, the initial number of clusters is identified based on a combination of domain expertise and/or educated guessing by the marketer. In other examples, the initial number of clusters may be automatically identified by the control unit 33 based on the number of consumers, number of attributes, and other factors. For instance, the marketer or the control unit may identify twenty initial clusters that are used to determine the optimal number of clusters. The clusters of consumers may be overlapping significantly and the goal of the method 200 is to maximize the distance between the individual clusters in order to identify consumers with similar attribute values in relation to the KPI.

Next, at 220, the control unit 33 computes an initial similarity value for a group of the initial number of clusters, where the similarity value is indicative of a similarity among the clusters in the group. Ideally, consumers within each cluster must have very similar characteristics (e.g., attribute values) to one another. In one example, the control unit 33 first computes the initial similarity value for a group of at least two clusters. Various processes can be used to compute the similarity value for the group of clusters. In one example implementation, the similarity value for the group of clusters is determined by computing the ratio or variance of within-cluster sum of squares and between-cluster sum of squares for the group of clusters. That way, the control unit compares the similarity between the two clusters based on the attribute values of the consumers and their relation to the KPI in the contextual space.

At 230, the control unit 33 iteratively updates the group of the initial number of clusters to compute an updated similarity value for each iteration. For example, the group of clusters (e.g., two clusters) is updated with one cluster to include three clusters. An updated similarity value is computed for the updated group of clusters. This process is performed for every iteration until the last possible cluster of the initial number of clusters is added to the group. In other words, during each iteration, the group of clusters is updated from the previous iteration (e.g., by adding one cluster) and an updated similarity value for the group of clusters is calculated.

At 240, the control unit 33 compares a previous similarity value with the updated similarity value at each iteration to determine a change in the similarity value. In one example, the first previous similarity value is the initial similarity value (e.g., for the first group of two clusters). In other words, the control unit 33 calculates the change in the similarity value by determining the difference between the updated similarity value for every new iteration and the previous similarity value from the previous iteration (e.g., the similarity value for the group of three clusters is compared to the previous similarity value for the group of two clusters). That way, the control unit 33 obtains a list of similarity values from all iterations and a corresponding list of the differences of similarity values between successive iterations.

Next, at 250, the control unit 33 determines an optimal number of clusters when the change in the similarity value is below a quantile based similarity value. In addition, the control unit 33 also determines the centroids of these clusters. For example, the control unit arranges the differences in the similarity values in descending order, computes a quantile based similarity value (e.g., a median) of all differences, and compares the differences to the quantile based similarity value. When the difference between two successive iterations is below the quantile based similarity value, the control unit 33 selects the corresponding number of clusters in that group to determine the optimal number of clusters.

Therefore, the optimal number of clusters is based on the input data processed by the processor, the KPI identified by the marketer, and the position of the attribute values for the attributes in the contextual space. In other words, the consumers in these clusters have similar attribute values and are likely to behave similarly with respect to the KPI. However, these clusters may be overlapping (i.e., several clusters may include attribute values/consumers that are the same or very similar). The ultimate goal of the marketer is to identify the most valuable segments of consumers, which include consumers with very close characteristics (based on the alignment between their attribute values and the KPI). Thus, the proposed method uses additional techniques to further separate the identified clusters and to construct segments of similar consumers that do not overlap.

With continued reference to FIG. 2, the control unit 33 constructs a plurality of segments of similar consumers by using the clusters (at 140). That process creates a plurality of segments of similar consumers that have comparable attribute value positions in the contextual space, and therefore, are likely to act similarly with respect to the KPI.

Figure 5:
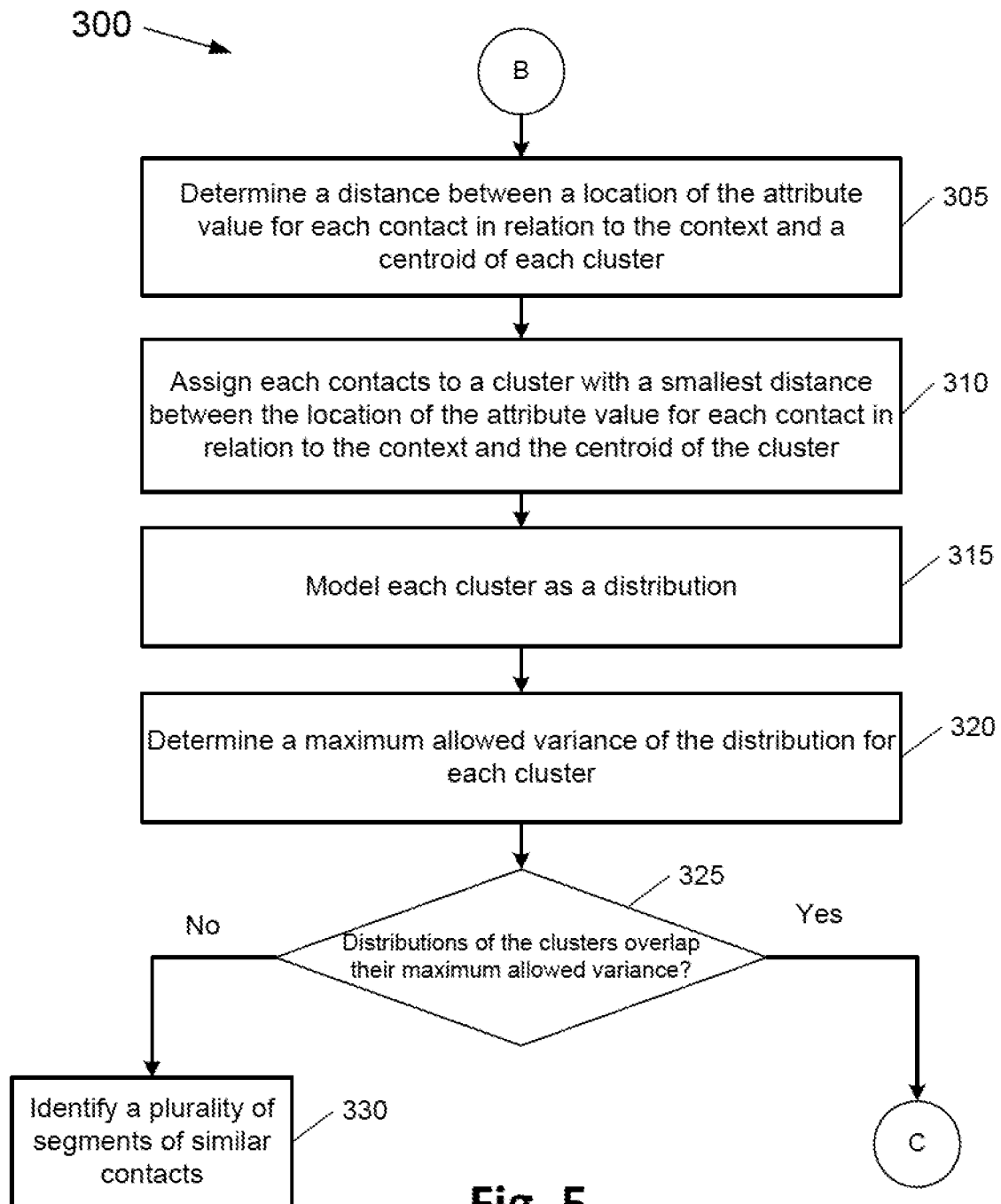
FIGS. 5 and 6 illustrate a flow chart showing an example of a method for constructing a plurality of segments of similar consumers by using the clusters identified by the method of FIG. 4 in accordance with an implementation of the present disclosure.
Figure 6:
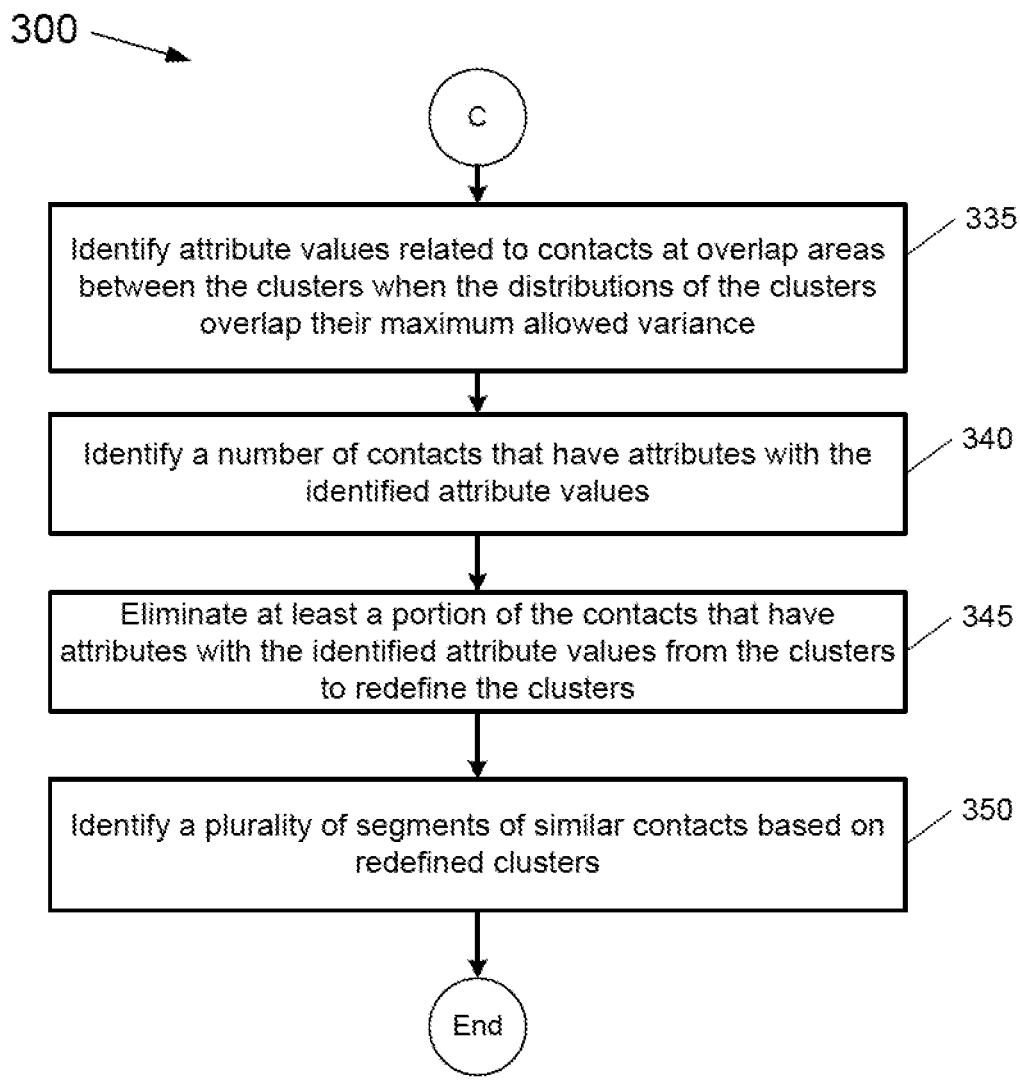

FIGS. 5 and 6 illustrate a method 300 for constructing a plurality of segments of similar consumers by using the clusters identified by the method 200. In one example, the method 300 can be executed by the control unit 33 of the processor 30. Various elements or blocks described herein with respect to the method 300 are capable of being executed simultaneously, in parallel, or in an order that differs from the illustrated serial manner of execution. The method 300 is also capable of being executed using additional or fewer elements than are shown in the illustrated examples. The method 300 may be executed in the form of instructions encoded on a non-transitory machine-readable storage medium 37 executable by the processor 30 of the computing device 10. In one example, the instructions for the method 100 implement the segmentation module 41.

The method 300 begins at 305, where the control unit 33 determines a distance between a location of the attribute value for each consumer (e.g., attribute values A-C of FIG. 3) in relation to the context (i.e., the KPI) and the centroid of each cluster. In one example, the distance is determined by using a metric calculated based on all attribute values for the at least one attribute in relation to the KPI. For instance, the control unit may compute the metric based on the KPI probability distribution. In the example dataset shown in FIG. 3, the metric may be computed based on all of the attribute values for the attribute and the resulting probability that each possible value corresponds to the KPI (i.e., the consumer owns a smartphone). Thus, the metric is computed based on all attributes values for all consumers in the dataset (when the dataset includes more than one attribute per consumer).

The following formula may be used to determine the distance between the location of the attribute value for each consumer in relation to the context KPI and the centroid of each cluster:

$$\Delta s = \sqrt{g_{\mu\nu}(z)\Delta z^\mu \Delta z^\nu}$$

In the formula, $\Delta s$ is the distance between the two points (i.e., the location of the attribute value for each consumer in relation to the context KPI and the centroid of each cluster), g is the metric that is used, z is the value of an attribute, and $\mu$ and $\nu$ are indices over the attributes with a sum over said attributes implied. The value of the metric varies not only by attribute but by the value of attribute.

At 310, the control unit 33 assigns each consumer from the dataset to a cluster with a smallest distance between the location of the attribute value for each consumer in relation to the context and the centroid of the cluster. Therefore, the control unit may reassign some of the consumers to different clusters and other consumers may stay in the clusters that they were originally placed. At 315, the control unit 33 models each of the identified clusters as a distribution. In other words, the control unit creates a distribution model for each cluster based on the attribute values for the consumers included in the cluster. Various distribution techniques may be used to model each of the clusters as distributions (e.g., normal or Gaussian distribution, etc.).

Next, the control unit 33 determines a maximum allowed variance of the distribution for each cluster (at 320). Thus, the modeled distributions for each cluster may include information about: 1) the mean value for the attribute values in that cluster; 2) the maximum allowed variance for that distribution. The maximum allowed variance for each distribution may be computed using the metric of the KPI probability distribution in the contextual space. These parameters allow the control unit 33 to identify the tails of the distributions. This is done for all clusters. The control unit 33 then determines whether the distributions of the clusters overlap their maximum allowed variance (at step 325). In other words, the control unit 33 determines whether the tails of the distributions of the clusters intersect. If the distributions of the clusters do not overlap their maximum allowed variance, the control unit 33 identifies a plurality of segments of similar consumers based on the existing clusters (at 330). That means that the constructed segments are not overlapping and the potential consumers are grouped based on their similar association to the KPI.

If, on the other hand, the distributions of the clusters overlap their maximum allowed variance, the control unit 33 proceeds to 335. Overlapping of the maximum allowed variance of the cluster distributions means that there is overlap between the clusters. At 335, the control unit 33 identifies attribute values related to consumers at overlap areas between the clusters. In other words, the values of the attributes related to each consumer are identified in the places of intersection between the distributions (i.e., clusters).

Next, the control unit 33 identifies a number of consumers that have attributes with the identified attribute values (at 340). The number of these consumers may vary depending on the initial dataset, the attribute values, the KPI, etc. At 345, the control unit 33 eliminates at least a portion of the consumers that have attributes with the identified attribute values from the clusters to redefine the clusters. In other words, if consumers that were assigned to a cluster fall outside of the maximum allowed variance of the distribution, they are "dropped" from the cluster and are placed into a set of "orphans." In some examples, the control unit 33 may eliminate a predetermined number of "orphans" such that the set of eliminated consumers does not exceed a predetermined value or a percentage of the total number of potential consumers. Alternatively, the control unit 33 may merge at least two clusters into a single cluster when these two clusters overlap significantly.

At 350, the control unit 33 identifies a plurality of segments of similar consumers based on the redefined clusters. In other words, the resulting redefined clusters of consumers are identified as segments that can be targeted by the marketer to offer different products or services. The control unit 33 may further characterize the identified segments. For example, the control unit may determine the values of the at least one attribute that are most likely (i.e., have a relatively high probability) to be found in each segment and the attribute values that are indicative of the segment (i.e., a consumer with those values will most likely be classified in that segment).

In one example implementation, the control 33 unit may compute a probability of each attribute included in the segment (when the segment includes more than one attribute) and a probability of the each attribute value for each attribute included in the segment. These probabilities may be computed based on the number of consumers in the segment associated with that attribute or with the attribute value, as compared to the number of consumers in all segments associated with that attribute or with the attribute value. Only the attributes and the attribute values that stand out are used to characterize the segment. Considering the example in FIG. 3, the attribute value A (consumer owns all four device) may be considered unique to a segment and may be used to characterize that segment. That way, all segment become "actionable" since they can be identified based on the attribute values of the consumers. Marketers can now have information how these segments and the consumers in the segments behave in relation to the KPI.

Information about the processed dataset, the identified segments, and the consumers, may be presented in various ways. In one example, the output from the control unit may consists of tables with: (a) a summary of the KPI performance and the size of each segment; (b) each consumer's segment membership (i.e., the segment to each consumer is placed), consumer's distance from the segment-centroid, and consumer's corresponding percentile rank; and (c) the characteristic attributes for each segment, measured relative to the optimal KPI.

Figure 7:
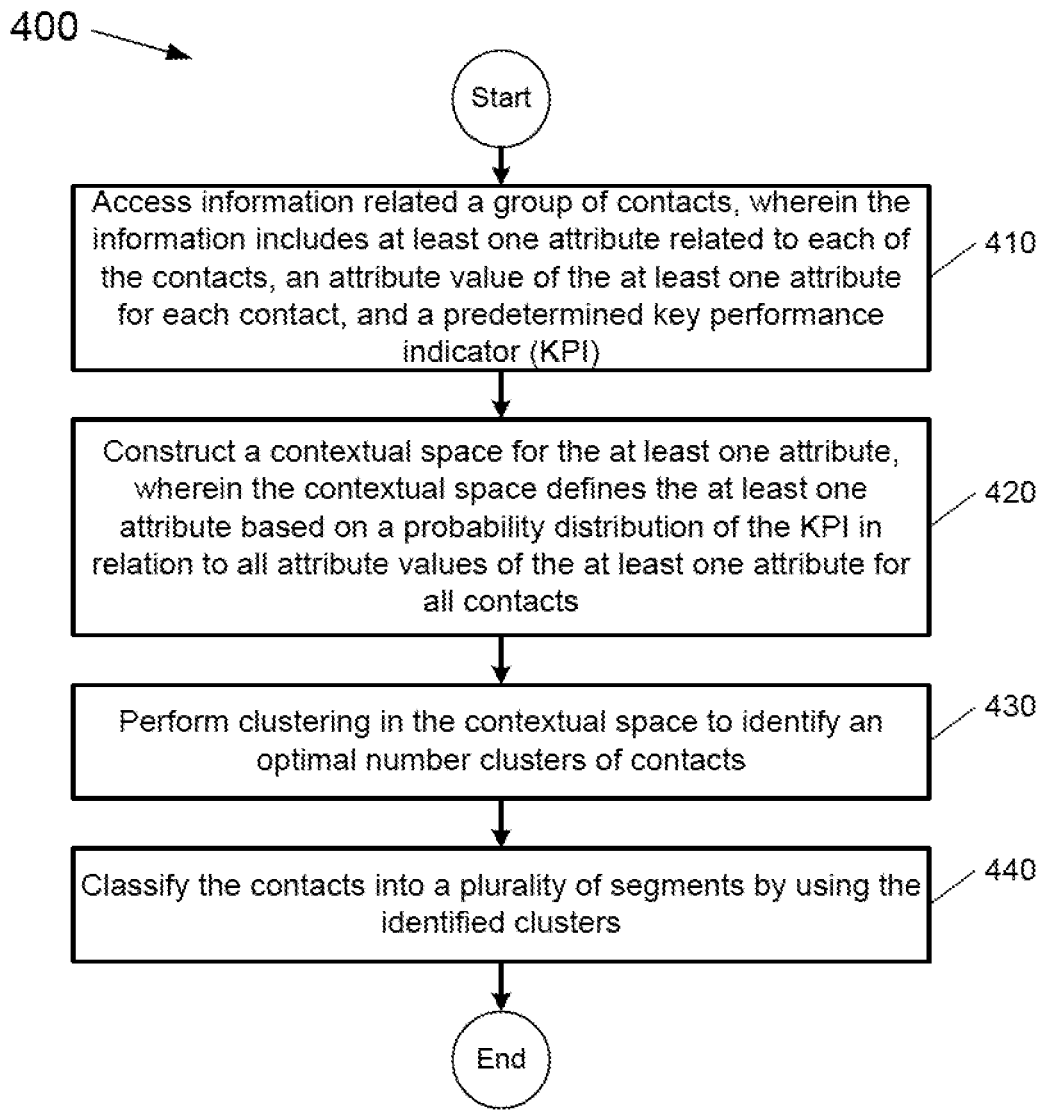
FIG. 7 illustrates a flow chart showing an example of an alternative method for constructing market segments of consumers in accordance with an implementation of the present disclosure.

FIG. 7 illustrates a flow chart showing an example of an alternative method 400 for constructing market segments of consumers in accordance with an implementation of the present disclosure. In one example, the method 400 can be executed by the system 5 that includes the computing device 10. The method 400 may be executed with the contextual space construction module 39, the cluster determination module 40, and the segmentation module 41, where these modules are implemented with electronic circuitry used to carry out the functionality described below. Various elements or blocks described herein with respect to the method 400 are capable of being executed simultaneously, in parallel, or in an order that differs from the illustrated serial manner of execution.

The method 400 begins at 410, where the system 5 is to access information related a group of consumers. That step is similar to step 110 of the method 100 and the information includes at least one attribute related to each of the consumers, an attribute value of the at least one attribute for each consumer, and a predetermined KPI. Next, the systems 5 is to construct a contextual space for the at least one attribute related to each consumer (at 420). The contextual space defines the at least one attribute based on a probability distribution of the KPI in relation to all attribute values of the at least one attribute for all consumers. That step is similar to step 120 of the method 100.

At 430, the system 5 is to perform clustering in the contextual space to identify optimal number clusters of consumers. This step involves processes that are similar to the processes described in respect to method 200. Based on the identified optimal number of clusters, the system 5 is to classify the consumers into a plurality of segments (at 440). That step is similar to the processes described in respect to method 300.

What is claimed is:

1. A method, comprising:

storing data related to a group of contacts in a centralized data manager, wherein the data includes at least one attribute related to each of the contacts and the data for a contact is collected during a set of digital events, each digital event associated with the contact's interaction with a digital stimulus at a computing device, the digital stimulus provided over one of a plurality of digital channels of a computer network and the at least one attribute for each contact is an aspect of that contact's interaction with the digital stimulus;

enhancing the obtained data for the contact by utilizing the data from the set of digital events related to the contact to access additional data associated with the contact and supplementing the obtained data with the additional data by: determining first data for the contact collected during a digital event, determining a distributed data source on the computer network, sending a request for the additional data to the distributed data source, the request including the first data collected during the digital event, receiving a response to the request, the response including second data related to the first data and the contact and enhancing a data record for the contact stored in the centralized data manager with the second data received from the distributed data source;

defining a contextual space based on the attribute values of the at least one attribute based on a probability distribution of a Key Performance Indicator in relation to all attribute values for the at least one attribute for all contacts by assigning a position in the contextual space for each attribute value of the at least one attribute for each contact based on the attribute value and its relation to the Key Performance Indicator, wherein the contextual space is a non-Euclidean topological space over all the attribute values for the at least one attribute value for all contacts;

defining the at least one attribute based on the contextual space;

determining clusters of contacts based on the probability distribution of the Key Performance Indicator in relation to the attribute values of the at least one attribute for all contacts; and constructing a plurality of segments of similar contacts that have comparable attribute value positions in the contextual space by determining a distance between the position of each attribute value for each contact with relation to the Key Performance Indicator and a centroid for each of the clusters and redefining the clusters based on a maximum allowed variance of a distribution for each cluster.

2. The method of claim 1, wherein constructing a plurality of segments of similar contacts further includes:

determining the distance by using a metric calculated based on all attribute values for the at least one attribute in relation to the context, and assigning each contact to a cluster with a smallest distance between the location of the attribute value for each contact in relation to the context and the centroid of the cluster.

3. The method of claim 2, wherein constructing a plurality of segments of similar contacts further includes:

modeling each cluster as a distribution, determining a maximum allowed variance of the distribution for each cluster, and identifying a plurality of segments of similar contacts when the distributions of the clusters do not overlap their maximum allowed variance.

4. The method of claim 3, wherein constructing a plurality of segments of similar contacts further includes:
identifying attribute values related to contacts at overlap areas between the clusters when the distributions of the clusters overlap their maximum allowed variance,
identifying a number of contacts that have attributes with the identified attribute values,
eliminating at least a portion of the contacts that have attributes with the identified attribute values from the clusters to redefine the clusters, and
identifying a plurality of segments of similar contacts based on redefined clusters.

5. The method of claim 1, wherein determining clusters of contacts her includes identifying an optimal number of clusters.

6. The method of claim 5, wherein identifying an optimal number of clusters further includes:
identifying an initial number of clusters,
computing an initial similarity value for a group of the initial number of clusters, where the similarity value is indicative of a similarity among the clusters in the group,
iteratively updating the group of the initial number of clusters to compute an updated similarity value for each iteration,
comparing a previous similarity value with the updated similarity value at each iteration to determine a change in the similarity value, wherein a first previous similarity value is the initial similarity value, and
determining an optimal number of clusters when the change in the similarity value is below a quantile based similarity value.

7. A system, comprising:
a processor;
a data store storing data related to a group of contacts, wherein the data includes at least one attribute related to each of the contacts and the data for a contact is collected during a set of digital events, each digital event associated with the contact's interaction with a digital stimulus at a computing device, the digital stimulus provided over one of a plurality of digital channels of a computer network and the at least one attribute for each contact is an aspect of that contact's interaction with the digital stimulus; and
a non-transitory computer readable medium comprising instructions for:
enhancing the obtained data for the contact by utilizing the data from the set of digital events related to the contact to access additional data associated with the contact and supplementing the obtained data with the additional data by: determining first data for the contact collected during a digital event, determining a distributed data source on the computer network, sending a request for the additional data to the distributed data source, the request including the first data collected during the digital event, receiving a response to the request, the response including second data related to the first data and the contact and enhancing a data record for the contact stored in the centralized data manager with the second data received from the distributed data source;
defining a contextual space based on the attribute values of the at least one attribute based on a probability distribution of a Key Performance Indicator in relation to all attribute values for the at least one attribute for all contacts by assigning a position in the contextual space for each attribute value of the at least one attribute for each contact based on the attribute value and its relation to the Key Performance Indicator, wherein the contextual space is a non-Euclidean topological space over all the attribute values for the at least one attribute value for all contacts;
defining the at least one attribute based on the contextual space;
determining clusters of contacts based on the probability distribution of the Key Performance Indicator in relation to the attribute values of the at least one attribute for all contacts; and
constructing a plurality of segments of similar contacts that have comparable attribute value positions in the contextual space by determining a distance between the position of each attribute value for each contact with relation to the Key Performance Indicator and a centroid for each of the clusters and redefining the clusters based on a maximum allowed variance of a distribution for each cluster.

8. The system of claim 7, wherein constructing a plurality of segments of similar contacts further includes:
determining the distance by using a metric calculated based on all attribute values for the at least one attribute in relation to the context, and
assigning each contact to a cluster with a smallest distance between the location of the attribute value for each contact in relation to the context and the centroid of the cluster.

9. The system of claim 8, wherein constructing a plurality of segments of similar contacts further includes:
modeling each cluster as a distribution,
determining a maximum allowed variance of the distribution for each cluster, and
identifying a plurality of segments of similar contacts when the distributions of the clusters do not overlap their maximum allowed variance.

10. The system of claim 9, wherein constructing a plurality of segments of similar contacts further includes:
identifying attribute values related to contacts at overlap areas between the clusters when the distributions of the clusters overlap their maximum allowed variance,
identifying a number of contacts that have attributes with the identified attribute values,
eliminating at least a portion of the contacts that have attributes with the identified attribute values from the clusters to redefine the clusters, and
identifying a plurality of segments of similar contacts based on redefined clusters.

11. The system of claim 7, wherein determining clusters of contacts further includes identifying an optimal number of clusters.

12. The system of claim 11, wherein identifying an optimal number of clusters further includes:
identifying an initial number of clusters,
computing an initial similarity value for a group of the initial number of clusters, where the similarity value is indicative of a similarity among the clusters in the group,
iteratively updating the group of the initial number of clusters to compute an updated similarity value for each iteration,
comparing a previous similarity value with the updated similarity value at each iteration to determine a change in the similarity value, wherein a first previous similarity value is the initial similarity value, and determining an optimal number of clusters when the change in the similarity value is below a quantile based similarity value.

13. A non-transitory computer readable medium, comprising instructions for:

storing data related to a group of contacts, wherein the data includes at least one attribute related to each of the contacts and the data for a contact is collected during a set of digital events, each digital event associated with the contact's interaction with a digital stimulus at a computing device, the digital stimulus provided over one of a plurality of digital channels of a computer network and the at least one attribute for each contact is an aspect of that contact's interaction with the digital stimulus; and a non-transitory computer readable medium comprising instructions for:

enhancing the obtained data for the contact by utilizing the data from the set of digital events related to the contact to access additional data associated with the contact and supplementing the obtained data with the additional data by: determining first data for the contact collected during a digital event, determining a distributed data source on the computer network, sending a request for the additional data to the distributed data source, the request including the first data collected during the digital event, receiving a response to the request, the response including second data related to the first data and the contact and enhancing a data record for the contact stored in the centralized data manager with the second data received from the distributed data source;

defining a contextual space based on the attribute values of the at least one attribute based on a probability distribution of a Key Performance Indicator in relation to all attribute values for the at least one attribute for all contacts by assigning a position in the contextual space for each attribute value of the at least one attribute for each contact based on the attribute value and its relation to the Key Performance Indicator, wherein the contextual space is a non-Euclidean topological space over all the attribute values for the at least one attribute value for all contacts;

defining the at least one attribute based on the contextual space;

determining clusters of contacts based on the probability distribution of the Key Performance Indicator in relation to the attribute values of the at least one attribute for all contacts; and constructing a plurality of segments of similar contacts that have comparable attribute value positions in the contextual space by determining a distance between the position of each attribute value for each contact with relation to the Key Performance Indicator and a centroid for each of the clusters and redefining the clusters based on a maximum allowed variance of a distribution for each cluster.

14. The non-transitory computer readable of claim 13, wherein constructing a plurality of segments of similar contacts further includes:

determining the distance by using a metric calculated based on all attribute values for the at least one attribute in relation to the context, and assigning each contact to a cluster with a smallest distance between the location of the attribute value for each contact in relation to the context and the centroid of the cluster.

15. The non-transitory computer readable of claim 14, wherein constructing a plurality of segments of similar contacts further includes:

modeling each cluster as a distribution, determining a maximum allowed variance of the distribution for each cluster, and identifying a plurality of segments of similar contacts when the distributions of the clusters do not overlap their maximum allowed variance.

16. The non-transitory computer readable of claim 15, wherein constructing a plurality of segments of similar contacts further includes:

identifying attribute values related to contacts at overlap areas between the clusters when the distributions of the clusters overlap their maximum allowed variance, identifying a number of contacts that have attributes with the identified attribute values, eliminating at least a portion of the contacts that have attributes with the identified attribute values from the clusters to redefine the clusters, and identifying a plurality of segments of similar contacts based on redefined clusters.

17. The non-transitory computer readable of claim 13, wherein determining clusters of contacts further includes identifying an optimal number of clusters.

18. The non-transitory computer readable of claim 17, wherein identifying an optimal number of clusters further includes:

identifying an initial number of clusters, computing an initial similarity value for a group of the initial number of clusters, where the similarity value is indicative of a similarity among the clusters in the group, iteratively updating the group of the initial number of clusters to compute an updated similarity value for each iteration, comparing a previous similarity value with the updated similarity value at each iteration to determine a change in the similarity value, wherein a first previous similarity value is the initial similarity value, and determining an optimal number of clusters when the change in the similarity value is below a quantile based similarity value.

* * * * *

UNITED STATES PATENT AND TRADEMARK OFFICE
CERTIFICATE OF CORRECTION

PATENT NO. : 10,565,603 B2
APPLICATION NO. : 15/111324
DATED : February 18, 2020
INVENTOR(S) : Brooks et al.

It is certified that error appears in the above-identified patent and that said Letters Patent is hereby corrected as shown below:

In the Claims

Column 15, at Line 17, replace "her" with --further--.

Column 17, at Line 38, replace "ail" with --all--.

Signed and Sealed this
Seventeenth Day of May, 2022

Katherine Kelly Vidal
*Director of the United States Patent and Trademark Office*